March 20, 1951 B. D. McINTYRE ET AL 2,546,038
SHOCK ABSORBER CONSTRUCTION
Filed June 30, 1950 2 Sheets-Sheet 1
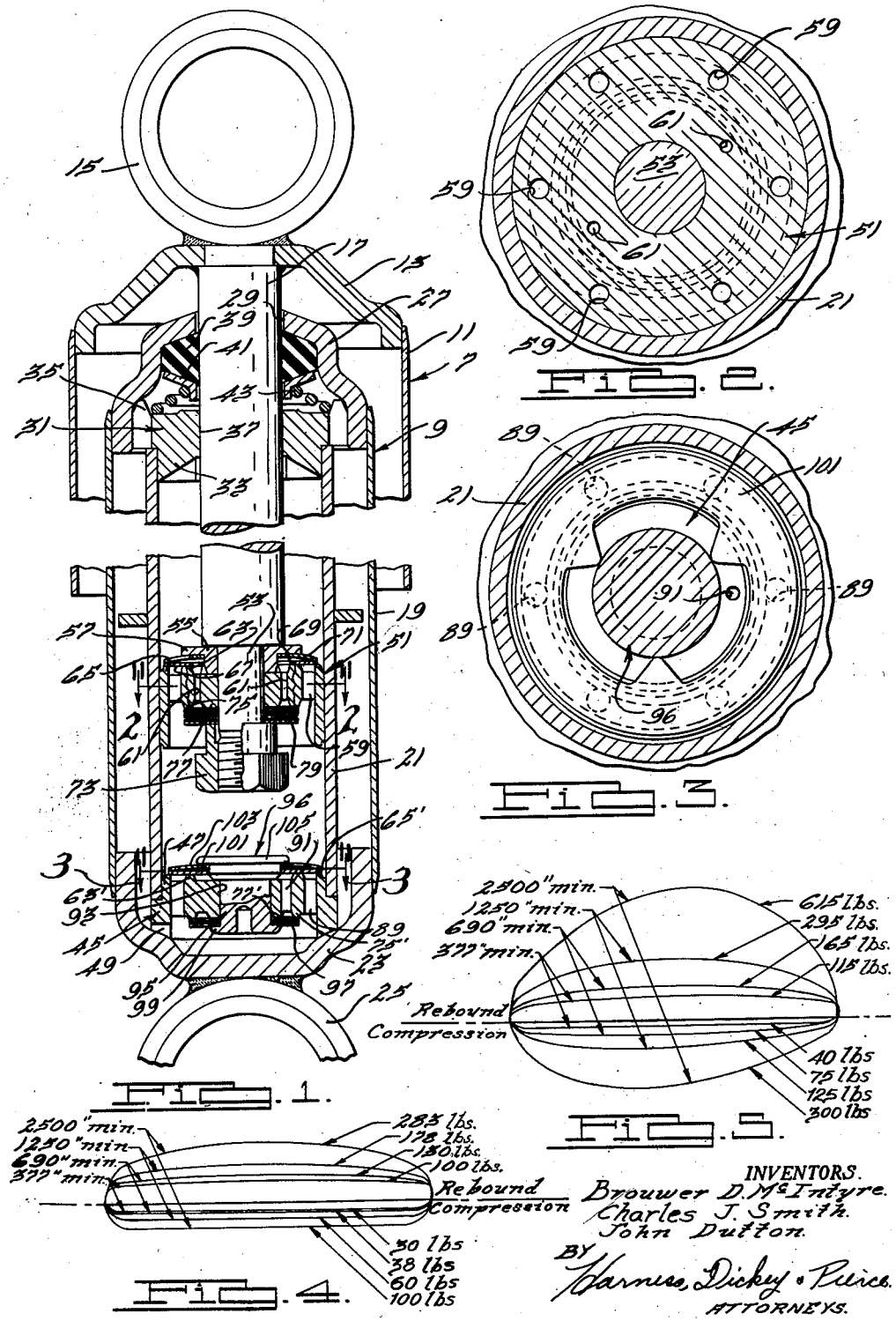
INVENTORS.
Brouwer D. McIntyre.
Charles J. Smith.
John Dutton.
BY Harness, Dickey & Pierce
ATTORNEYS.

March 20, 1951     B. D. McINTYRE ET AL     2,546,038
SHOCK ABSORBER CONSTRUCTION
Filed June 30, 1950     2 Sheets-Sheet 2
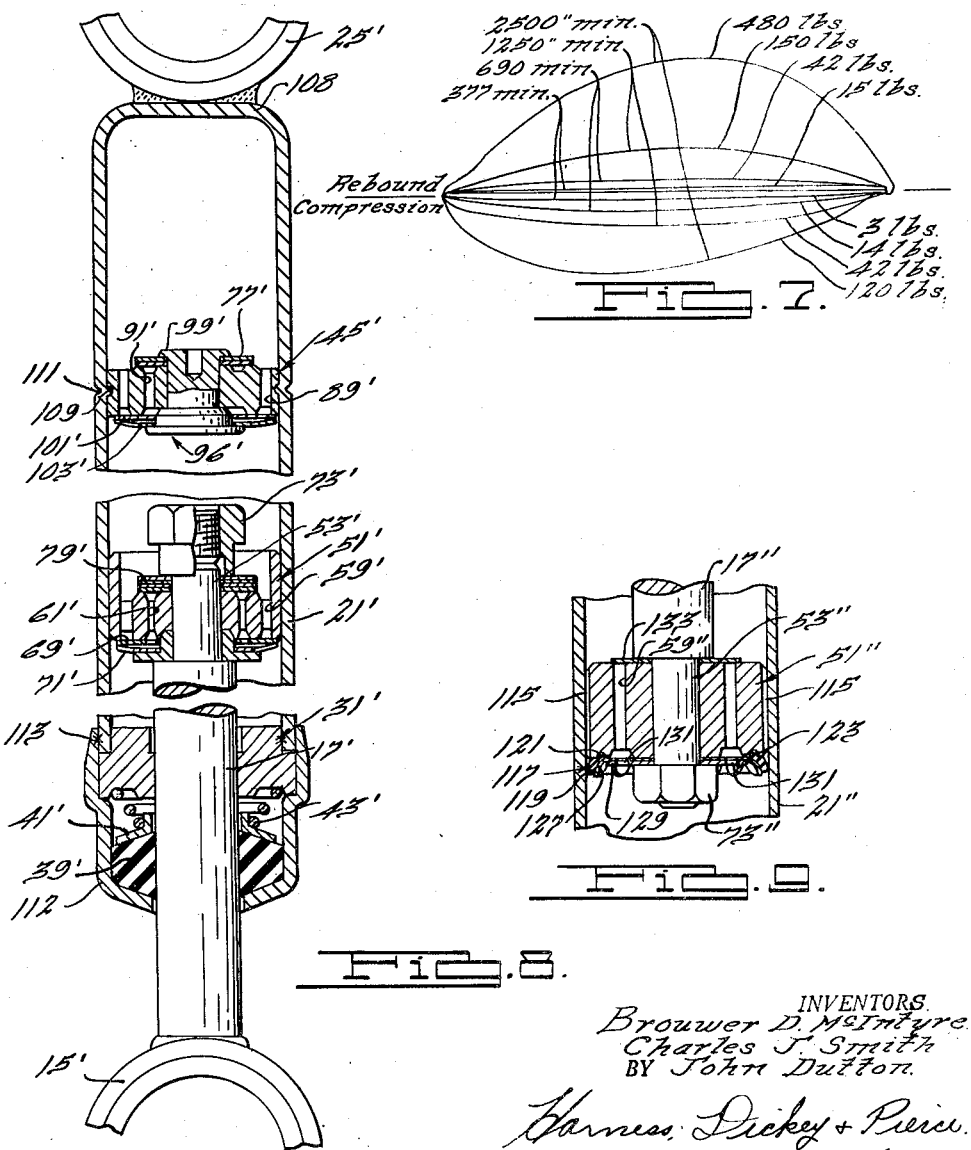

Patented Mar. 20, 1951

2,546,038

UNITED STATES PATENT OFFICE 2,546,038

SHOCK ABSORBER CONSTRUCTION

Brouwer D. McIntyre, Charles J. Smith, and John Dutton, Monroe, Mich., assignors to Patent Development Company, Monroe, Mich., a partnership Application June 30, 1950, Serial No. 171,472

10 Claims. (Cl. 188—88)

This invention relates generally to shock absorbers and more particularly to improvements in direct acting hydraulic shock absorbers, and is a continuation in part of applicants' copending application Serial No. 58,982, filed November 8, 1948, now abandoned.

Most direct acting hydraulic shock absorbers now in use embody an inner pressure cylinder and an outer reserve chamber, both of which normally contain hydraulic fluid; valve means normally disposed in the lower end of the pressure cylinder to control the interflow of fluid between the pressure cylinder to the reserve chamber; and a piston operable in the pressure cylinder, having valve means associated therewith to control the flow of fluid from one side of the piston to the other during the movement of the piston within the cylinder. The valve means between the pressure cylinder and the reserve chamber includes a resistance valve primarily provided to control the compression stroke of a shock absorber and a replenishing valve operable on the extension stroke, while the piston has a resistance valve to primarily control the rebound motion of the shock absorber and a replenishing valve operable on the compression stroke. The valve means between the pressure cylinder and the reserve chamber usually includes a valve body provided with two radially spaced sets of circumferentially spaced openings. Valve disks are provided on the opposite faces of the valve and each disk covers one set of openings to prevent the flow of fluid therethrough in one direction and to restrict the flow of fluid therethrough in the opposite direction, although the replenishing valve offers only a minimum of resistance. The piston is similarly constructed with openings and valve disks. The valve disks are adapted to be unseated with respect to their openings by means of predetermined fluid pressure, so as to permit the flow of fluid from one side of either valve to the other side thereof, and thus control the shock absorber action.

It has always, in the past, been deemed desirable to provide a sufficient number of openings, which were large enough in diameter, so as to offer only a minimum of resistance to the flow of fluid therethrough, regardless of the velocity of either the piston or the fluid within the shock absorber. With the aforementioned structure, the valve disks alone control the flow of fluid through either the piston or the compression valve. As a result of this, certain problems have arisen which have been heretofore unsolved.

For example, when shock absorbers are applied to a motor vehicle and the vehicle is moving along a relatively smooth surface, the velocity of the piston and the fluid within the pressure cylinder is relatively slow. However, if the vehicle is driven over extremely rough pavement, the velocity of the piston and the fluid within the pressure cylinder is very fast. With the aforementioned valving construction, it has been very difficult to obtain the ultimate vehicle riding characteristics both on relatively smooth surfaces and relatively irregular surfaces. For example, if the valve disk of the piston, which controls the rebound stroke of the shock absorber, is relatively stiff, so that a fairly high fluid pressure is required to unseat it, a good vehicle ride may be obtained on irregular surfaces. However, this stiffness of the valve disk will impede the provision of a smooth and extremely desirable ride when the vehicle is traveling on smooth surfaces, and a certain amount of harshness will be imparted to the ride because of the amount of pressure required to unseat the disk. Conversely, if the valve disk can be readily unseated by a relatively low fluid pressure, a desirable ride on smooth surfaces will be obtained for the vehicle, but the ride will not be as desirable as possible on highly irregular surfaces, due to the fact that the rapid rate of movement of the piston will cause the valve disk to unseat too easily, thereby preventing the proper shock absorber control.

Therefore, in order to obtain the ultimate in shock absorber ride control with valving alone, it would seem desirable to provide a valve in which the valve disk could be readily unseated when the vehicle was moving over relatively smooth pavement, and the piston is moving at a relatively low velocity, and in which the valve disks were stiff and not easily unseatable when the vehicle was passing over highly irregular surfaces, and the piston is moving at a relatively high velocity within the pressure cylinder. This, of course, would be very difficult to do, but the present invention embodies an arrangement by means of which the same effect is obtained by using a new combination of valving and restricted orifice control.

In the present construction, relatively flexible valve disks are provided on the piston and the compression valve, as described above, but restrictive openings or orifices are provided in both the piston and compression valve which are of such a size that they will offer only a slight amount of resistance to the flow of fluid through either the piston or the compression valve, when the vehicle is moving over relatively smooth surfaces, and the piston is moving at relatively low velocities. Therefore, under these conditions the valve disks will primarily control the flow of fluid through the valve bodies. However, the size of the openings in the piston and the compression valve will offer increasingly higher resistance to the flow of fluid therethrough as the velocity of the piston and the velocity of the flow of fluid increases, such as when the vehicle is being driven over highly irregular surfaces. Therefore, with this construction the valve disks will be unseated at substantially the same pressures at both high and low speeds of piston movement, but additional restriction in the valve body openings will be set up at higher piston velocities so as to primarily control the flow of fluid therethrough and provide in effect the same control as if a stiff valve disk were being used for high piston velocities. This arrangement, as will be hereinafter more fully brought out, provides the ultimate in vehicle riding characteristics, in a relatively simple and efficient manner.

The principal objects of this invention are, therefore, to provide a direct acting shock absorber construction in which the control of the flow of fluid therein is at a maximum at all times; to provide a shock absorber construction which, when mounted on a vehicle, will provide the ultimate in vehicle riding characteristics over both relatively smooth and relatively irregular surfaces; to provide, in a shock absorber construction, both velocity and pressure responsive means in the piston and the compression valve thereof, for controlling the flow of fluid therethrough, so that the pressure responsive means will primarily control the flow of fluid at relatively low piston and fluid velocities, and the velocity responsive means will primarily control the flow of fluid through the piston and compression valve at high piston and fluid velocities; to provide generally a novel shock absorber construction in which maximum control is obtained in a relatively simple, economical and efficient manner; to provide a shock absorber of the aforementioned type in which a novel liquid reservoir construction is provided; and to provide in a shock absorber of the aforementioned type a novel valve construction.

These and other objects of this invention will become apparent from the following detailed description, taken in conjunction with the accompanying drawings, in which:

Figure 1 is a longitudinal sectional view of the shock absorber of this invention;

Fig. 2 is an enlarged cross-sectional view of the structure illustrated in Fig. 1, taken along the line 2—2 thereof;

Fig. 3 is an enlarged sectional view of the structure illustrated in Fig. 1, taken along the line 3—3 thereof;

Fig. 4 is an illustrative graphic representation of the resistance or control provided by a conventional shock absorber at different velocities of piston and fluid movement;

Fig. 5 is a similar illustrative graphic representation of the resistance of the shock absorber of this invention;

Fig. 6 is an illustrative graphic representation of the resistance or control provided by the shock absorber referred to in Fig. 4, wherein the valve disks are removed and only the openings in the piston and base valve are relied upon to provide resistance;

Fig. 7 is an illustrative graphic representation of the resistance or control provided by the shock absorber of this invention, referred to in Fig. 5, wherein the valve disks are removed and only the openings in the piston and base valve are relied upon to provide resistance;

Fig. 8 is a longitudinal sectional view of a further embodiment of the shock absorber of this invention; and, Fig. 9 is a fragmentary sectional view of a still further embodiment of the invention.

Referring now to the drawings and more particularly to Figs. 1 to 3, it will be seen that the shock absorber includes telescoping sections 7 and 9, which are movable longitudinally with respect to each other, when the shock absorber is attached between the sprung and unsprung portions of a vehicle, or the like. The section 7 includes a tubular portion 11 having an end cap 13 secured to the upper end thereof. The end cap 13 is adapted to be connected to the sprung portion of a vehicle by means of a ring-like attaching element 15. A piston rod 17 has its upper end rigidly connected to the under side of the base portion of said cap 13 and depends therefrom into the section 9, as will be hereinafter brought out. The section 9 includes a tubular member 19, which is concentric with the tubular member 11 and partially surrounded thereby, and which forms a fluid reservoir chamber for the shock absorber. A second tubular member 21, is concentrically disposed within the reserve tube 19, and forms a pressure cylinder within which the main operating parts of the shock absorber are disposed. The lower end of the reserve tube 19 is closed by means of an end cap 23 which is adapted to be connected to the unsprung portion of a vehicle by any suitable means, such as a ringlike attaching member 25. The upper end of the reserve tube 19 is closed by means of an end cap 27 which is provided with a central aperture 29, in the base portion thereof, through which the piston rod 17 extends.

The upper end of the pressure cylinder 21 is closed by means of a head or piston rod guide member 31, which is provided with a reduced portion 33, which fits into the upper end of the pressure cylinder 21. The rod guide 31 is provided adjacent the outer periphery thereof, with a plurality of circumferentially spaced upwardly extending projections 35, which engage the end cap 27 and thereby lock the rod guide against movement with respect to the pressure tube 21, when the shock absorber is assembled. The rod guide 31 is provided with a central aperture 37, through which the piston rod 17 extends. A rubber seal 39 surrounds the piston rod 17 and is confined within the upper portion of the end cap 27 by means of a retainer element 41 and a spring 43, the lowermost convolution of which seats upon the upper face of the rod guide 31, within the confines of the projections 35.

The lower end of the pressure cylinder 21 is closed by means of a base compression valve body or cylinder end 45. The cylinder end or valve body 45 is provided on the outer periphery thereof with a reduced portion 47, over which the lower end of the pressure tube 21 is fitted. The bottom face of the valve body 45 abuts the end cap 23, so that the valve body is locked against movement between the end cap and the pressure tube 21. The valve body 45 is provided adjacent the lower end thereof with a plurality of circumferentially spaced passageways 49, which communicate the reserve chamber 19 with the under side of the central portion of the valve body 45.

The reserve tube or chamber 19 is adapted to contain a reserve supply of hydraulic medium, in addition to that which is disposed in the pressure cylinder 21, and the fluid in the pressure cylinder is displaced in dependence upon relative movement of the shock absorber sections 7 and 9 by means of a piston 51, which is connected to the lower end of the piston rod 17 for reciprocation within the pressure cylinder upon relative movement of the shock absorber sections. The lower end of the piston rod 17 is reduced in diameter at 53 to extend through the piston 51. A support washer 55, having an annular flange 57 on the upper end thereof, abuts the shoulder formed at the upper end of the reduced piston rod portion 53, and has its lower end disposed in a recess in the upper face of the piston 51, adjacent the piston rod reduced portion 53. The piston 51 is provided with an outer set of circumferentially spaced passageways 59 and a pair of opposed smaller passageways 61, which are disposed radially inwardly from the outer set of passageways 59. The upper face of the piston 51 is provided with a circumferential upwardly projecting rim or land 63, between the inner and outer sets of passageways 59 and 61. A second upwardly projecting land or rim 65 is provided on the upper surface of the piston 51 adjacent the outer periphery thereof. A disk type valve 67 is seated upon the upper faces of annular lands 63 and 65 and is of the type illustrated in Fig. 3. The valve 67 closes off the upper ends of the outer set of passageways 59 and is provided with openings 69 above the inner set of passageways 61, so as not to affect the flow of fluid through these passageways. The disk valve 67 is resiliently held in engagement with the upper face of the piston 51 by means of a star shaped spring 71. The spring 71 is slidably supported on the shank portion of the support washer 55, and the annular flange of the support washer engages the inner peripheral portion of the star spring so as to preload the disk valve 67 through the spring 71, a predetermined amount. The disk valve 67 thus lies flat on the piston lands 63 and 65 and is not clamped against the lands but rather is free to be lifted off of its seat against the action of the spring 71.

The piston 51 is locked on the reduced piston rod portion 53, with its upper face engaging the lower face of the support washer 55, by means of a nut 73, which is threaded on the lower end of the piston rod reduced portion 53. The bottom face of the piston 51 is provided, in addition to a downwardly projecting land 75, which corresponds to the land 63 previously described, with a downwardly projecting land 77, adjacent the piston rod reduced portion 53. A laminated disk valve 79 abuts the bottom faces of lands 75 and 77, so as to normally close off the lower end of the two inner passageways 61, and the nut 73 engages the bottom face of the disk valve 79 so as to resiliently maintain the disk valve 79 in position to normally close off the lower ends of the two piston openings 61.

The compression base valve body 45 is provided with an outer set of circumferentially spaced passageways 89 and a single inner passageway 91, in much the same manner as the aforementioned piston, except that the compression valve body has only a single inner passageway. This, of course, results from the fact that on the compression stroke of the piston there is less displacement of the fluid through the passageway 91 than there is through the passageways 61 of the piston on the rebound stroke of the latter, due to the piston rod and its displacement. The upper and lower faces of the valve body are provided with lands in the same manner as the upper and lower faces of the piston, so that the lands thereof are indicated by primed numbers corresponding to like numbers in the piston construction. The base valve body 45 is provided with a central aperture 93, through which is etxended the shank portion 95 of a partially hollow rivet 96. The lower end of the valve body passageway 91 is normally closed by means of a laminated disk valve 97 which has the outer periphery seated against the bottom face of the land 75' and the inner periphery held in engagement with the lower face or land 77' of the valve body by a spun over portion 99 on the lower end of the rivet shank 95. The outer periphery of the laminated disk valves 97 can thus be unseated away from the lower end of the valve body passageway 91 by a predetermined fluid pressure.

The upper ends of the base valve passageways 89 are resiliently closed by means of a disk valve 101 which corresponds to the disk valve 67 used in the piston construction. A star spring 103 holds the disk valve 101 in its closed position, in the same manner as previously described, in conjunction with the piston. The rivet 96 is formed with an annular flange or head 105 in the upper end thereof, which engages the star spring 103 so as to load the disk valve 101 by a predetermined amount in the same manner as previously described.

It should at this time be pointed out that the two inner passageways 61 in the piston 51, and the single inner passageway 91 in the base valve body 45, are of such a size as to offer only a minimum or slight amount of resistance to the flow of fluid therethrough when the shock absorber is being actuated at a relatively low velocity such as 377 inches per minute, and the valve disks 79 and 97 have been opened or unseated, but will offer increasingly higher resistance to the flow of fluid therethrough while the valve disks are being maintained opened or unseated, and the speed of operation of the shock absorber increases, as will clearly appear hereinafter.

In operation, when the piston 51 travels downwardly the fluid in the pressure cylinder 21 below the piston passes upwardly through the outer piston passageways 59 and the pressure of the fluid moves the disk valve 67 off of its seat on the lands 63 and 65, against the action of the star spring 71, and enables the fluid to flow into the portion of the cylinder above the piston. Due to the fact that the piston rod 17 occupies a portion of the cylinder 21 above the piston 51, the available space in this portion of the cylinder is less in volume than the space below the piston, thus as the piston continues to move downwardly sufficient pressure is built up against the disk valve 97 in the base compression valve assembly to unseat or move the latter off its seat on the land 75', and permit the excess fluid to flow through the opening 91 into the reserve chamber 19. However, and as will appear hereinafter, if the shock absorber is operating at high piston and fluid velocities, resistance will be set up in the valve passageway 91 for controlling the flow of fluid from the pressure cylinder to the reserve chamber, in addition to that control provided by the valve disk 97.

When the piston 51 moves in an upward direction in the pressure cylinder 21, the fluid under pressure trapped above said piston passes through the two piston passageways 61 and acts against the laminated disk valve 79 to force the same off its seat on the land 75, and permits the fluid to flow from the upper portion of the cylinder into the portion of the cylinder below the piston. As the piston 51 travels upwardly in the cylinder, the piston rod 17 moves out of the cylinder and it is necessary to replenish the lower portion of the cylinder with the fluid. This additional supply of fluid is supplied from the reserve tube 19, through the compression base valve passageways 89, which fluid unseats the disk valve 101 against the action of the star spring 103, which opens relatively freely so that very little or no resistance is offered to the flow of fluid to the cylinder, thus replenishing the supply of fluid in the lower portion of the cylinder. Again, it must be pointed out that the fluid flowing from the upper portion of the cylinder through the two piston passageways 61 will be controlled primarily by the pressure responsive disk valve 77 during low piston and low fluid velocities and by the disk valve 77 and the resistance set up in the passageways 61 when the shock absorber is operating at high piston and fluid velocities.

The shock absorber illustrated in Fig. 8 is generally similar to that illustrated in Figs. 1–3, the main difference being in the location of the fluid reservoir. Parts of the shock absorber of this embodiment corresponding to parts of the previous embodiment are indicated by primed numbers corresponding to the part numbers employed in Figs. 1–3. In this embodiment the pressure cylinder 21' is of a greater length than that illustrated in the previous embodiment, and the outer cylinder, forming the reserve chamber 19, is eliminated. The ringlike attaching member 25' is connected directly with an end wall 108, closing one end of the pressure cylinder 21', while the other ringlike attaching member 15' is connected with the piston rod 17', adjacent the opposite end of the pressure cylinder. The base valve body 45' is secured in the tube 21', in spaced relationship with rod guide 31', as in the previous embodiment, but due to the increase in the length of the pressure cylinder tube, is disposed intermediate the ends thereof so that the reservoir or reserve chamber is provided between the base valve and cylinder end wall 108. The valve body 45' has an annular groove 109 in the peripheral wall thereof, and the pressure cylinder wall is crimped at 111 into the groove 109 to connect the valve body with the pressure cylinder. The lower end of the pressure cylinder is closed by an end cap 112, which is rigidly connected with the pressure cylinder wall at 113. The rod guide 31', seal 39' and other adjacent parts are disposed between the pressure cylinder and end cap in substantially the same manner as described above. The base valve and the piston of the shock absorber of this embodiment are constructed in the same manner as in the previous embodiment, so that a detailed description thereof is not deemed necessary.

When the shock absorber is in use on a vehicle or the like, it is turned upside down or inverted relative to the shock absorber illustrated in Fig. 1, so that an air space will be provided in the upper portion of the reservoir, adjacent the end wall 108, and fluid can flow from the reserve chamber portion to the pressure cylinder portion. Thus, on the compression stroke of the shock absorber or movement of the piston 51' toward the base valve body 45', fluid displayed by the operating rod 17' will flow through the base valve body passageway 91' into the reservoir portion of the pressure cylinder tube, as well as through the piston passageways 59' into the portion of the pressure cylinder between the rod guide 31' and the piston. On the rebound stroke, or movement of the piston away from the base valve body fluid will flow through the piston passageways 61' in the manner previously described, to the portion of the pressure cylinder between the base valve and piston, and fluid will flow from the reservoir portion of the pressure cylinder tube through the base valve passageways 89', to the portion of the pressure cylinder between the base valve and the piston to maintain the same in a properly filled condition at all times.

Thus, while the shock absorber of this embodiment operates in the same manner as that previously described, this shock absorber does eliminate the necessity of a second tube, in order to provide a fluid reservoir or reserve chamber, and provides a more inexpensive and simple shock absorber construction than that illustrated in Fig. 1, which is usable on vehicles or other devices where there is the necessary amount of space to permit a longer shock absorber to be employed. Therefore, this shock absorber has certain advantages, but is not always usable in some installations because of its greater length.

In Fig. 9, a further embodiment of a piston construction is illustrated, which piston construction is usable with either of the aforementioned shock absorbers. The primary difference between the piston illustrated in Fig. 9 and the pistons previously illustrated is in the position of the orifices or restricted passageways, and the type of valve construction employed in conjunction therewith. In this embodiment, the piston 51" is centrally bored to receive the reduced lower end 53" of the piston rod 17". The outer periphery of the piston body has one or more grooves 115 therein, which have an area equivalent to the area of the passageways 61 of the piston illustrated in Figs. 1–3, so as to provide orifices or restricted passageways in the piston. The lower ends of the grooves 115 are normally closed by pressure responsive valve means, adapted to function in the same manner as the valve disks 79 of the previous embodiment, in the form of an annular rubber member 117, which has an annular lip 119, which normally engages the inner wall of the pressure cylinder 21" so as to prevent the flow of fluid from the lower portion of the pressure cylinder, or the portion between the piston and base valve body, to the portion of the pressure cylinder on the opposite side of the piston. The annular rubber member 117 is formed inwardly of the lip 119, with an annular projection 121, which is disposed in a complemental recess 123 in the under side of the piston body 51", so as to prevent the member 117 from shifting relative to the piston. A resilient springlike annular disk 127 engages the rubber member 117 to hold it in engagement with the piston 51", and to resiliently retain the lip 119 in engagement with the pressure cylinder wall. A washer 129 engages the spring disk 127 radially inwardly of the annular lip 119 to maintain both the spring disk and the rubber member in engagement with the piston, and the nut 73" on the lower end of the piston rod 17" engages the washer 129 to retain the rubber member and springlike disk in an assembled relationship relative to the piston. The washer 129 and spring disk 127 are suitably apertured at 131 to permit fluid to flow upwardly therethrough and into the compression passageways 59″ on the compression stroke of the piston. The upper ends of the passageways 59″ are normally closed by a relatively light, flexible disk 133, the inner portion of which is held in engagement with the upper surface of the piston by the piston rod shoulder, at the upper end of the piston rod reduced portion 53″.

Thus, on the rebound stroke of the piston 51″ fluid flows through the piston grooves 115 and moves the rubber member lip 119 and resilient disk 127 away from the piston body and pressure cylinder wall, at a predetermined pressure, to permit the flow of fluid thereby. Resistance to fluid flow at higher velocities is set up in the grooves 115 in the same manner as in the passageways 61 of the previous embodiment. On the compression stroke of the piston the fluid flows through the passageways 59″ and deflects the valve disk 133 at a predetermined velocity, to permit fluid to flow therepast, in the same manner as previously described. Thus, the piston construction illustrated in Fig. 9 operates in the same manner as in the previous embodiments, but is formed in a slightly different manner to illustrate a further way in which the piston may be constructed and valved.

Referring now to Fig. 4, wherein an illustrative graphic resistance curve is shown for a conventional shock absorber, in which orifice or passageway resistance is removed as much as possible, that is, where the valve disks are relied upon to control the flow of fluid from one side to the other of the piston on the rebound stroke of the latter, and from one side to the other of the base valve in compression, it will be seen that when the piston is moving at a velocity of approximately 377 inches per minute, the resistance to the flow of fluid from one side of the piston to the other side will be approximately 100 pounds. When the velocity of the piston is increased to approximately 690 inches per minute the resistance will increase to 130 pounds. When the piston velocity increases to approximately 1250 inches per minute, the piston will offer only 178 pounds of resistance to the flow of fluid therethrough, and when the piston velocity increases to approximately 2500 inches per minute, the piston resistance will amount to about only 283 pounds. It will also be noted from the generally straight line nose of each curve, that a substantial resistance is obtained very rapidly with this construction, so that a vehicle can be controlled for boulevard riding. However, there is no large increase in resistance for rough road riding, as with the construction of this invention.

Fig. 6 shows a graphic resistance curve similar to Fig. 4 and obtained from the same shock absorber, except that the valve disks which normally close the fluid flow openings or passageways in the piston and base valve have been removed, so that any resistance obtained is caused by restriction in the piston openings and friction between the relatively movable parts of the shock absorber, and the viscosity of the hydraulic fluid. While restriction has been removed as much as possible in the passageways of the piston and base valve of most conventional shock absorbers, a very limited amount of resistance always remains, as it is impossible to completely eliminate all resistance no matter how many holes are put into the piston and base valve bodies. The shock absorber from which the graphic resistance curves of both Figs. 4 and 6 were obtained, had a one inch diameter pressure cylinder, a one-half inch diameter operating rod and nine .076″ diameter rebound holes, or passages, approximately 3/16″ in length, in the piston and three .089″ diameter compression holes or passages in the base valve. Two 3/4″ diameter spring steel washers or valve disks, one .006″ thick and one .008″ thick, were used for normally closing the piston rebound openings. The portion of the nut 73 engaging the disks 79 had a diameter of .415″. However, the number and thicknesses of the disks can be varied in accordance with the results desired and the type of suspension. As can be seen in Fig. 6, on the rebound side thereof, at a piston velocity of 377 inches per minute, zero pounds of resistance to flow of fluid past the piston was provided by the openings or passages and the aforementioned other factors. At a piston speed of 690 inches per minute, a total of approximately ten pounds of resistance to fluid flow was provided. At a speed of 1250 inches per minute, a total of approximately fifteen pounds of resistance was provided, and at 2500 inches per minute a total of approximately thirty pounds of resistance was provided. It will thus be seen that the rebound passageways in a conventional piston, wherein restriction is removed as much as possible, provide practically no resistance to the flow of fluid therethrough, even at high piston velocities.

The only reason that the resistance increases in the manner illustrated in Fig. 4, from 100 pounds at a velocity of 377 inches per minute, to 283 pounds at a velocity of 2500 inches per minute, is because of the spring rate of the flexible valve disks used to normally close the openings against the flow of fluid therethrough, which are actuatable to open position by a predetermined fluid pressure, but which, when the velocity of the piston and thus the pressure of the fluid increases, will offer an increasingly higher resistance as they are moved or deflected away from their valve seat on the piston in order to accompany the greater fluid flow at higher pressures and velocities. This spread in resistance, as the velocity increases, is due only nominally to the resistance provided by the openings, friction, etc., and is due almost entirely to the spring rate of the valve disks. From a practical standpoint, it is impractical and virtually impossible to use or employ a light disk which will open at a relatively low fluid pressure and which will have a high enough spring rate so that as the velocity of the piston and pressure of the fluid go up, the resistance offered thereby will go up in the same general proportion. Thus, it is not feasible to provide valve disks which will blow off at a light fluid pressure, to give satisfactory vehicle riding conditions on boulevard pavement, and which will provide the necessary resistance and control and provide a satisfactory vehicle ride on rough roads, wherein the pressures and velocities of the piston and fluid are high.

The curves illustrated in Figs. 4 and 6 thus clearly show that no appreciable resistance to piston movement is achieved by the openings in the piston, and this, of course, is in agreement with the theory of operation on which shock absorbers have been built for years, that is, to remove restriction as much as possible from the openings. It will, of course, also be appreciated that the curves illustrated in Figs. 4 and 6 are merely illustrative of one conventional type of shock absorber, and these curves can be varied depending upon the type of the valve disks employed to control the flow of fluid through the piston. For example, if heavier valve disks were employed, it would take a greater pressure to unseat them and permit fluid to flow through the piston, and if lighter valve disks were employed it would take a lesser pressure to open the same and there would be a lesser spread in the resistance curves at the various velocities of the piston.

Furthermore, while it has not been discussed in detail, the same conditions and general operation are present and occur in the base valve on the compression stroke of the shock absorber, and little or no resistance is obtained in the base valve openings in the conventional shock absorber, so that the base valve can be considered to operate in generally the same manner as the piston, which has been described in detail. By way of example, the three .089" base valve compression passages are normally closed by spring washers or valve disks of the type described for the piston, and the rivet flange 99 or 99' is spun thereagainst to provide a predetermined loading thereof. In the curve shown in Fig. 4, these valve disks will be opened by a fluid pressure of approximately 30 pounds, and the spring rate of the disks will cause the resistance to increase, in the manner shown, for the same reasons as discussed in connection with the piston. Of course, as the base valve compression passages handle only fluid displaced by the operating rod, there will be a lesser fluid flow therethrough than through the piston rebound passages.

When the combination velocity and pressure responsive piston of this invention is used, the results are quite different, as can be seen in Fig. 5, wherein it will be seen that when the piston is traveling at a velocity of approximately 377 inches per minute, the piston resistance to fluid flow from one side to the other thereof is approximately 115 pounds. When the piston velocity increases to 690 inches per minute, the resistance is increased to 165 pounds. When the piston velocity increases to 1250 inches per minute the piston resistance increases to 295 pounds, and when the piston velocity reaches approximately 2500 inches per minute the piston resistance is increased to 615 pounds. With the construction of this invention, due to the use of the valve disks, the desired resistance is still obtained for vehicle boulevard riding, as indicated by the generally straight line nose of each curve and the resistance provided at low velocities and the necessary additional resistance for proper vehicle control on rough surfaces is obtained by the use of the restricted passageways. It will also be appreciated that the use of only the restricted passageways would not be entirely satisfactory, as there would be very little control during low piston velocities, when the vehicle was moving on smooth surfaces, such as a good boulevard. In addition, the use of only a restricted passageway or orifice would not be satisfactory because variations in atmospheric temperatures, such as from summer to winter, would cause too great a change in performance for good commercial results. This performance variance would be caused by changes in the shock absorber fluid viscosity, due to changes in temperature, so that the use of only a restricted orifice would not be satisfactory.

In the obtainance of the aforementioned results shown in Fig. 5, the two piston rebound passageways were each of an .076" diameter and approximately $\tfrac{3}{16}$" in length, and the single base valve passageway 91 or 91' was of an .055" diameter, as it handles a considerably smaller amount of fluid flow than does the piston, because it only handles fluid displaced by the piston rod. While the passageways or holes were of the aforementioned sizes, these passages will only provide the results shown in Fig. 5, with a fluid or liquid of a certain viscosity, and where the diameter of the pressure cylinder is one inch. The liquid used in the test has a viscosity of 85–90 Saybolt seconds at 100° F., as did the liquid used in testing the shock absorber referred to in connection with Figs. 4 and 6. Obviously the hole diameters could be altered to vary the resistance curve when a liquid having the stated viscosty is employed, and could be altered to obtain the same resistance if a fluid or liquid of a different viscosity were employed in the shock absorber. Likewise, these diameters may vary if the length of the passageways is varied, so long as a predetermined resistance to fluid flow is maintained thereby. Furthermore, for different sized pressure cylinders the passage sizes would have to be changed in order to obtain the same resistance values, as will be seen from the table hereinafter set forth. Thus, it will be appreciated that while the results shown in Fig. 5 were obtained with passageways of the size heretofore mentioned, they could be obtained with various other passage sizes. Also, it should be distinctly understood that the results shown in Fig. 5 could be varied by varying the characteristics of the valve disks which close the passages. Still further, the curves are merely illustrative and the resistance desired will vary, with different types of vehicle suspension systems on which the shock absorber is used and with various types and weights of vehicles on which the shock absorber is mounted. Thus, the sizes of the piston and base valve passages and the resistances obtained are merely illustrative of one specific example of a shock absorber of this invention, and are not to be considered as limiting the invention to the example illustrated. The sizes of the passages may vary within limits, within the scope of the invention, just so long as they permit a relatively free flow of fluid therethrough at low piston and fluid velocities and provide the primary resistance to fluid flow at high velocities.

In order to show the amount of resistance which is provided by the piston rebound passages or orifices themselves, without the use of the valve disks 79 or 79' or the rubber member 117, which is used with the grooves 115 in Fig. 9, which grooves, by the way, correspond in cross sectional area with the passageways 61 and 61', tests were conducted and the results are shown in the graphic resistance curve shown in Fig. 7. The piston and base valve passages used in the test recorded in Fig. 7 were of the same size as those used in the tests recorded in Fig. 5. As can be seen from Fig. 7, at a piston velocity of 377 inches per minute the passages, friction, etc., provided only 15 pounds of total resistance to fluid flow, at a velocity of 690 inches per minute, only 42 pounds of total resistance was provided, at a velocity of 1250 inches per minute, 150 pounds of total resistance was provided, and at a high velocity of 2500 inches per minute, 480 pounds of total resistance was provided. It will thus be seen that at low velocities, such as 377 inches per minute, the passages, friction, etc., provided only a nominal or minimum amount of restriction, so that a relatively free fluid flow was achieved, while at high piston velocities such as 2500 inches per minute, the passages provided the primary resistance to piston movement.

Thus, from the results shown in Figs. 5 and 7, the percentages of respective resistance offered by the restricted passages, friction, etc., and the valve disks, can be readily calculated by dividing the resistance value, at a given velocity, from Fig. 5, into the resistance value for the same velocity, shown in Fig. 7. For example, at a velocity of 377 inches per minute if the 115 pounds of resistance from Fig. 5 is divided into the 15 pounds of resistance from Fig. 7, it will be seen that the percentage of the total resistance provided by the restricted passageways friction, etc., in the piston is 13%, and of course the remainder, or 87% is provided by the valve disks. Likewise, it can be calculated that the total resistance provided by the restricted passages is 25.4% at 690 inches per minute, 50.8% at 1250 inches per minute, and 78% at 2500 inches per minute. By comparing these percentages with those which can be obtained from Figs. 4 and 6, the startling difference in results can be appreciated. From Figs. 4 and 6 it can be seen that in the conventional shock absorber the percentage of total resistance or control caused by the passages friction, etc., calculated in the manner described above, is zero at 377 inches per minute, 7.7% at 690 inches per minute, 8.4% at 1250 inches per minute, and 10.5% at 2500 inches per minute. Thus, it is readily apparent that the passages in a conventional shock absorber cannot provide the necessary resistance or control at high piston velocities, such as are desirable for a shock absorber on a vehicle moving over extremely rough pavement or roads, and also it can be seen that the percentage of control caused by the restricted passages of the present invention on normal boulevard conditions is extremely low and does not adversely affect the operation of the shock absorber. Still further, the same piston and base valve disks were employed in the tests on both the conventional shock absorber and the illustrative shock absorber of this invention, and if lighter spring disks had been employed in the tests on the shock absorber of this invention, as might be the actual case to meet a given problem, the differences would have been even more startling. While the base valve results have not been discussed in detail, they are shown in the drawing, and it can be readily seen that the same general characteristics apply for the base valve when a restricted passageway is used, as for the piston, and the same general results are obtained in both, in view of the restriction. The valve disks used in the obtainance of the results shown in Fig. 5 correspond to the valve disks used in the test from which the results shown in Fig. 4 were taken. It can also be seen from Fig. 5 that the resistance characteristics for the compression stroke compare favorably with those for the rebound stroke, but may total slightly less because of a lesser flow of fluid and because in many instances less control is desired or necessary on the compression stroke, as compared with the rebound stroke. But, as can clearly be seen, the passages provide the primary resistance at high velocities and the disks the main resistance at low velocity. As was pointed out, the results shown in Figs. 5 and 7 can be varied by varying the spring rate of the valve disks and the blow-off pressures thereof, as well as by varying the sizes of the restricted passageways. With the construction of this invention it is preferable to use a relatively light valve disk for closing the piston rebound passages 61, 61' or 115, so that a relatively light control will be provided, for vehicle boulevard riding conditions, so as not to impart harshness to the vehicle ride which would be occasioned if a heavy valve, which would blow off at a high pressure, were used. Thus, the values and results shown in the curves are representative of the results achieved with the shock absorber of this invention, but the invention is not limited to the exact figures illustrated and described.

The graphs shown in Figs. 4 and 5 are taken from actual tests conducted for the two types of shock absorber piston constructions, and both of these constructions employed the same valve disk arrangement with the only difference being in the restriction in the piston and base valve passageways. These results were obtained on shock absorbers having a one inch cylinder bore, and it will be appreciated that the resistance values noted could be easily altered by changing the valving arrangement and the sizes of the passageways. It will thus be apparent that with the piston and base valve of this invention, the resistance to the flow of fluid therethrough at high piston and fluid velocities is a great deal higher than obtained with the conventional type of shock absorber piston and base valve due to the resistance set up in the passageways. Also, the resistance to the flow of fluid at low piston and fluid velocities is substantially the same for both shock absorbers, due to the fact that the same valving was used for both shock absorbers tested and discussed herein.

From tests that have been run it is indicated that there is a critical relationship for a predetermined passage length, between the area of the piston rebound passages and the area of the pressure cylinder, less the area of the operating rod, i. e., the rebound chamber of the pressure cylinder, and between the area of the base valve compression passage and the area of the operating rod which displaces the fluid therethrough. For example, in a shock absorber having a one inch bore or pressure cylinder the area of the pressure cylinder is .7854 square inch, and if a one-half inch diameter operating rod is used, the area of the operating rod is .196 square inch, so that the area of the rebound chamber is the difference, or .589 square inch. The piston has two passages each .076" in diameter and an area of .00455 square inch. The area of the two holes is 2 x .00455 or .0091 square inch, which when divided by .589 square inch equals about 1.5% of the area of the rebound chamber. Tests indicate that if the total cross-sectional area of the piston rebound passages, for this size shock absorber, wherein the length of the passages is approximately $\frac{1}{16}$", is less than .0024 square inch, or .4% of the area of the rebound chamber, the results of this invention cannot be satisfactorily achieved, because relatively free flow of fluid at low velocities is no longer present. Likewise, it appears that if the total cross-sectional area of the piston rebound passages exceeds .020 square inch, or 5% of the area of the rebound chamber, the results of this invention will not be properly achieved because the desired orifice restriction at high velocity is not obtained. Thus, it appears that the area of the piston rebound passage or passages should be between .4% to 5% of the area of the rebound chamber. Of course, if the length of the passages were increased, the diameter of the passages could likewise be increased and the same resistance values obtained. Such increases are considered to be within the scope of this invention, if the same type of results are achieved. The same is true if a liquid of a different viscosity from that mentioned above, is used. As far as the base valve compression passage is concerned, it has been found that if the area thereof is less than .00078 square inch, which is .4% of the area of the operating rod, or more than .0098 square inch, which is 5% of the area of the operating rod, proper results are not obtained. Therefore, the area of the base valve compression passageway should not be less than .4% of the area of the operating rod, or more than 5% of the area of the operating rod. It will thus be seen that there is a critical range and relationship between the area of the piston rebound passages and the base valve compression passages relative to the area of the rebound chamber and the area of the operating rod, respectively, if the length of the passages does not vary materially and if fluid of a generally normal and conventional viscosity is employed.

It will, therefore, be seen that with the shock absorber of this invention the valve disks or pressure responsive means will primarily control the flow of fluid through the piston and base valve when the vehicle is traveling on relatively smooth surfaces, and the piston and fluid velocities are low. However, when the vehicle is traveling over irregular surfaces or rough roads and the piston sages and the shock absorber size, rebound chamber area, and operating rod area, the following table is presented. This table denotes piston and base valve passage sizes which are illustrative only, but the area of which is determined to produce a given percentage of area relative to the shock absorber rebound chamber area and operating rod area, as the case may be, in accordance with the critical range referred to above. This table furthermore presents the aforementioned data only for ⅞ inch, one inch, 1⅜ inch, and two inch pressure cylinder diameter shock absorbers, and of course, the invention is not limited to these exact sizes. Therefore, this table presents the data for the various sized shock absorbers to indicate the relationship between the various areas to obtain the percentage of .4% and the percentage of 5% between the piston and base valve passages and the rebound chamber area and operating rod area, respectively, and in addition for a one inch shock absorber, to show this relationship for the shock absorber from which the test results shown in Fig. 5 were obtained, and in which the area of the piston passages was 1.5% of the area of the rebound chamber and the area of the base valve passages was 1.2% of the area of the operating rod. Furthermore, the length of the passages for the different sized shock absorbers was in the vicinity of $\frac{3}{16}$ inch and did not vary enough to affect the data presented.

*Rebound*

| Pressure Cylinder Diameter | Operating Rod Diameter | Piston Passage Diameter | Number of Piston Passages | Pressure Cylinder Area | Operating Rod Area | Total Piston Passage Area | Percentage of Passage Area Relative to Rebound Chamber Area |
|---|---|---|---|---|---|---|---|
| C | D | P | | CA | DA | PA | $\% = \dfrac{PA}{CA-DA}$ |
| Inches | Inches | | | | | | Per cent |
| ⅞ | ⁷⁄₁₆ | .048 | 1 | .6013 | .1503 | .0018 | .4 |
| ⅞ | ⁷⁄₁₆ | .076 | 5 | .6013 | .1503 | .0225 | 5 |
| 1 | ½ | .055 | 1 | .7854 | .196 | .0023 | .4 |
| 1 | ½ | .079 | 6 | .7854 | .196 | .02945 | 5 |
| 1 | ½ | .076 | 2 | .7854 | .196 | .0091 | 1.5 |
| 1⅜ | ⅝ | .0775 | 1 | 1.485 | .307 | .0047 | .4 |
| 1⅜ | ⅝ | .112 | 6 | 1.485 | .307 | .0589 | 5 |
| 2 | 1 | .109 | 1 | 3.1416 | .7854 | .0094 | .4 |
| 2 | 1 | .158 | 6 | 3.1416 | .7854 | .1178 | 5 |

*Compression*

| Pressure Cylinder Diameter | Operating Rod Diameter | Base Valve Passage Diameter | Number of Passages | Pressure Cylinder Area | Operating Rod Area | Base Valve Passage Area | Percentage of Passage Area Relative to Operating Rod Area |
|---|---|---|---|---|---|---|---|
| C | D | P | | CA | DA | PA | $\% = \dfrac{PA}{DA}$ |
| Inches | Inches | | | | | | Per cent |
| ⅞ | ⁷⁄₁₆ | .028 | 1 | -------- | .1503 | .0006 | .4 |
| ⅞ | ⁷⁄₁₆ | .098 | 1 | -------- | .1503 | .0075 | 5 |
| 1 | ½ | .0315 | 1 | -------- | .196 | .00078 | .4 |
| 1 | ½ | .112 | 1 | -------- | .196 | .0098 | 5 |
| 1 | ½ | .055 | 1 | -------- | .196 | .0024 | 1.2 |
| 1⅜ | ⅝ | .0395 | 1 | -------- | .307 | .00123 | .4 |
| 1⅜ | ⅝ | .140 | 1 | -------- | .307 | .0153 | 5 |
| 2 | 1 | .063 | 1 | -------- | .7854 | .0031 | .4 |
| 2 | 1 | .158 | 2 | -------- | .7854 | .0392 | 5 | and fluid velocities are high, the resistance to the flow of fluid through the base valve and piston will be controlled both by the restricted passageways and the valve disks, and the primary resistance or control is provided by the restricted passageways.

In order to show the relationship between the size and area of the piston and base valve passages It has been found from actual road tests that when a vehicle is traveling on relatively smooth pavement, the velocity of the piston may vary from about zero inches per minute up to around 500 or 600 inches per minute, and will go up as the road surface becomes more irregular, and may reach an unusual and extreme velocity of 6000 inches per minute. What constitutes high and low velocities may be a matter of opinion, to at least a certain degree, but for the purposes of this disclosure, the following values have been chosen as representing high and low velocity. Low velocity 377 inches per minute, and high velocity 2500 inches per minute and above. Likewise, while the pressure at which the piston and base valve disks will be unseated, corresponding to either high or low velocity may vary, for the purpose of this disclosure, and as can be readily determined from Figs. 7 and 5, by subtracting 15 pounds (the resistance offered to fluid flow at a low velocity of 377 inches per minute, without a valve disk on the piston, Fig. 7) from 115 pounds (the total resistance offered at the same velocity with valve disks on the piston, Fig. 5), this pressure is in the neighborhood of 100 pounds.

What is claimed is:

1. A hydraulic shock absorber, comprising a pressure cylinder normally filled with liquid, means serving as a liquid reservoir for said pressure cylinder, closure means closing one end of said pressure cylinder, valve means adjacent the opposite end of said pressure cylinder controlling the interflow of liquid between said pressure cylinder and reservoir, a piston reciprocable in said pressure cylinder, an operating rod connected with said piston and extending through said closure means, said piston having passage means extending therethrough and constituting the only means of escape for liquid trapped in said pressure cylinder between said closure means and one side of said piston upon movement of said piston toward said closure means, and pressure responsive valve means for controlling the flow of fluid through said piston passages to the portion of said pressure cylinder on the opposite side of said piston, said pressure responsive valve means being automatically actuatable to open position in response to a predetermined pressure of liquid in said passage means, the area of said passage means being not less than .4% nor more than 5% of the area of said pressure cylinder less the area of said operating rod.

2. A hydraulic shock absorber comprising a pressure cylinder normally filled with liquid, means serving as a liquid reservoir for said pressure cylinder, closure means closing one end of said pressure cylinder, a valve body adjacent the opposite end of said pressure cylinder, a piston reciprocable in said pressure cylinder, an operating rod connected with said piston and extending through said closure means, said piston having passage means extending therethrough and constituting the only means of escape for liquid trapped in said pressure cylinder between said closure means and one side of said piston upon movement of said piston toward said closure means, and pressure responsive valve means cooperable with said passage means for controlling the flow of liquid therethrough to the portion of said pressure cylinder on said opposite side of said piston, said pressure responsive valve means being automatically actuatable to open position in response to a predetermined pressure of liquid in said passage means, the area of said passage means being not less than .4% nor more than 5% of the area of said pressure cylinder less the area of said operating rod, said valve body having an opening extending therethrough for the passage of liquid from said pressure cylinder to said liquid reservoir upon movement of said piston toward said valve body, pressure responsive valve means normally closing said opening against the flow of liquid from said pressure cylinder to said reservoir, said last mentioned valve means being automatically actuatable to open position in response to a predetermined pressure of liquid in said pressure cylinder, the area of said opening being not less than .4% nor more than 5% of the area of said operating rod.

3. A hydraulic shock absorber comprising a pressure cylinder normally filled with liquid, means serving as a liquid reservoir for said pressure cylinder, closure means closing one end of said pressure cylinder, a valve body adjacent the opposite end of said pressure cylinder, a piston reciprocable in said pressure cylinder, an operating rod connected with said piston and extending through said closure means, said piston having passage means extending therethrough controlling the interflow of liquid between portions of the cylinder on opposite sides of said piston, said valve body having an opening extending therethrough for the passage of liquid from said pressure cylinder to said liquid reservoir upon movement of said piston toward said valve body, and pressure responsive valve means normally closing said opening against the flow of fluid from said pressure cylinder to said reservoir, said valve means being automatically actuatable to open position in response to a predetermined pressure of liquid in said pressure cylinder, the area of said opening being not less than .4% nor more than 5% of the area of said operating rod.

4. A hydraulic shock absorber comprising a pressure cylinder normally filled with liquid, means serving as a liquid reservoir in said pressure cylinder, closure means closing one end of said pressure cylinder, valve means adjacent the opposite end of said pressure cylinder controlling the interflow of liquid between said pressure cylinder and reservoir, a piston reciprocable in said pressure cylinder, an operating rod connected with said piston and extending through said closure means, said piston having groovelike passage means of a predetermined size formed in the outer periphery thereof and constituting the only means of escape for liquid trapped in said pressure cylinder between said closure means and one side of said piston upon movement of said piston towards said closure means, and pressure responsive valve means including a flexible element normally closing one end of said piston passage means and engaging the inner wall of said pressure cylinder, said pressure responsive valve means being automatically actuatable to a position to permit fluid to flow through said piston passage means in one direction in response to a predetermined pressure of liquid in said passage means corresponding to low piston velocity, said piston passage means having a flow capacity allowing a relatively free flow of liquid at said low piston velocity so that liquid flow is controlled primarily by the resistance offered by said pressure responsive valve means, but offering the main resistance to flow of liquid through said piston under relatively high liquid pressure corresponding to high piston velocity, whereby minor shocks are accompanied by liquid flow through said passage means controlled primarily by said pressure responsive means and major shocks are accompanied by liquid flow through said passage means controlled primarily by said passage means, said piston having other passage means and valve means cooperable therewith to permit fluid to flow therethrough in a direction opposite to said one direction upon movement of said piston away from said closure means.

5. A hydraulic shock absorber, comprising a pressure cylinder normally filled with liquid, means serving as a liquid reservoir for said pressure cylinder, closure means closing one end of said pressure cylinder, valve means adjacent the opposite end of said pressure cylinder controlling the interflow of liquid between said pressure cylinder and a reservoir; a piston reciprocable in said pressure cylinder, an operating rod connected with said piston and extending through said closure means, said piston having passage means of predetermined size extending therethrough and constituting the only means of escape for liquid trapped in said pressure cylinder between said closure means, the area of said piston passage means being substantially 1.5% of the area of said pressure cylinder less the area of said operating rod and one side of said piston upon movement of said piston toward said closure means; and pressure-responsive valve means cooperable with said piston passage means for controlling the flow of liquid therethrough to the portion of said pressure cylinder on said opposite side of said piston, said pressure-responsive valve means being automatically actuatable to open position in response to a predetermined low pressure of liquid in said piston passage means, said piston passage means having a flow capacity allowing a relatively free flow of liquid at a low piston velocity of the order of 377 inches per minute so that liquid flow at such piston velocity is controlled primarily by the resistance offered by said pressure-responsive valve means, but offering the main resistance to flow of liquid through said piston under relatively high liquid pressure corresponding to high piston velocity of the order of 2500 inches per minute, whereby minor shocks are accompanied by liquid flow through said piston passage means so that movement of the piston is controlled primarily by said pressure-responsive valve means, and major shocks are accompanied by liquid flow through said piston passage means and the movement of the piston is then controlled primarily by the resistance to liquid flow offered by said piston passage means.

6. A hydraulic shock absorber, comprising a pressure cylinder normally filled with liquid, means serving as a liquid reservoir for said pressure cylinder, closure means closing one end of said pressure cylinder, a valve body adjacent the opposite end of said pressure cylinder, a piston reciprocable in said pressure cylinder, an operating rod connected with said piston and extending through said closure means, said piston having passage means of predetermined size extending therethrough and constituting the only means of escape for liquid trapped in said pressure cylinder between said closure means and one side of said piston upon movement of said piston toward said closure means, the area of said piston passage means being substantially 1.5% of the area of said pressure cylinder less the area of said operating rod, and pressure-responsive valve means cooperable with said piston passage means for controlling the flow of liquid therethrough to the portion of said pressure cylinder on said opposite side of said piston, said pressure-responsive valve means being automatically actuatable to open position in response to a predetermined low pressure of liquid in said piston passage means, said piston passage means having a flow capacity allowing a relatively free flow of liquid at a low piston velocity of the order of 377 inches per minute so that liquid flow at such piston velocity is controlled primarily by the resistance offered by said pressure-responsive valve means, but offering the main resistance to flow of liquid through said piston under relatively high liquid pressure corresponding to high piston velocity of the order of 2500 inches per minute, said valve body having an opening of predetermined size extending therethrough for the passage of liquid from said pressure cylinder to said liquid reservoir upon movement of said piston toward said valve body, the area of said valve opening being substantially 1.2% of the area of said operating rod, pressure-responsive valve means normally closing said valve opening against the flow of liquid from said pressure cylinder to said reservoir, said last-mentioned valve means being automatically actuatable to open position in response to a predetermined low pressure of liquid in said pressure cylinder, said valve opening having a flow capacity allowing a relatively free flow of liquid at a low piston velocity of the order of 377 inches per minute so that liquid flow at such piston velocity is controlled primarily by the resistance offered by said last-mentioned pressure-responsive valve means, but offering the main resistance to flow of liquid through said valve body under relatively high liquid pressure corresponding to high piston velocity of the order of 2500 inches per minute, whereby minor shocks are accompanied by liquid flow through said piston passage means or said valve opening, depending upon the direction of movement of said piston, controlled primarily by said pressure-responsive means and major shocks are accompanied by liquid flow through said piston passage means or said valve opening controlled primarily by the resistance to liquid flow offered by said piston passage means or said valve opening.

7. A hydraulic shock absorber, comprising a pressure cylinder normally filled with liquid, means serving as a liquid reservoir for said pressure cylinder, closure means closing one end of said pressure cylinder, a valve body adjacent the opposite end of said pressure cylinder, a piston reciprocable in said pressure cylinder, an operating rod connected with said piston and extending through said closure means, said piston having passage means of predetermined size extending therethrough controlling the interflow of liquid between portions of the cylinder on opposite sides of said piston, said valve body having an opening of predetermined size extending therethrough for the passage of liquid from said pressure cylinder to said liquid reservoir upon movement of said piston toward said valve body, the area of said valve opening being substantially 1.2% of the area of said operating rod, pressure-responsive valve means normally closing said valve opening against the flow of liquid from said pressure cylinder to said reservoir, said valve means being automatically actuatable to open position in response to a predetermined low pressure of liquid in said pressure cylinder, said valve opening having a flow capacity allowing a relatively free flow of liquid at a low piston velocity of the order of 377 inches per minute so that liquid flow at such piston velocity is controlled primarily by the resistance offered by said pressure-responsive valve means, but offering the main resistance to flow of liquid through said valve body under relatively high liquid pressure corresponding to high piston velocity of the order of 2500 inches per minute, whereby minor shocks are accompanied by liquid flow through said valve opening upon said piston movement controlled primarily by said pressure-responsive means, and major shocks are accompanied by liquid flow through said valve opening controlled primarily by the resistance to liquid flow offered by said valve opening.

8. A hydraulic shock absorber, comprising a pressure cylinder normally filled with liquid, means serving as a liquid reservoir for said pressure cylinder, closure means closing one end of said pressure cylinder, valve means adjacent the opposite end of said pressure cylinder controlling the interflow of liquid between said pressure cylinder and reservoir, a piston reciprocable in said pressure cylinder, an operating rod connected with said piston and extending through said closure means, said piston having passage means extending therethrough and constituting the only means of escape for liquid trapped in said pressure cylinder between said closure means and one side of said piston upon movement of said piston toward said closure means, and pressure responsive valve means for controlling the flow of fluid through said piston passages to the portion of said pressure cylinder on the opposite side of said piston, said pressure responsive valve means being automatically actuatable to open position in response to a predetermined pressure of liquid in said passage means, the area of said passage means being substantially 1.5% of the area of said pressure cylinder less the area of said operating rod.

9. A hydraulic shock absorber comprising a pressure cylinder normally filled with liquid, means serving as a liquid reservoir for said pressure cylinder, closure means closing one end of said pressure cylinder, a valve body adjacent the opposite end of said pressure cylinder, a piston reciprocable in said pressure cylinder, an operating rod connected with said piston and extending through said closure means, said piston having passage means extending therethrough and constituting the only means of escape for liquid trapped in said pressure cylinder between said closure means and one side of said piston upon movement of said piston toward said closure means, and pressure responsive valve means cooperable with said passage means for controlling the flow of liquid therethrough to the portion of said pressure cylinder on said opposite side of said piston, said pressure responsive valve means being automatically actuatable to open position in response to a predetermined pressure of liquid in said passage means, the area of said passage means being substantially 1.5% of the area of said pressure cylinder less the area of said operating rod, said valve body having an opening extending therethrough for the passage of liquid from said pressure cylinder to said liquid reservoir upon movement of said piston toward said valve body, pressure responsive valve means normally closing said opening against the flow of liquid from said pressure cylinder to said reservoir, said last mentioned valve means being automatically actuatable to open position in response to a predetermined pressure of liquid in said pressure cylinder, the area of said opening being substantially 1.2% of the area of said operating rod.

10. A hydraulic shock absorber comprising a pressure cylinder normally filled with liquid, means serving as a liquid reservoir for said pressure cylinder, closure means closing one end of said pressure cylinder, a valve body adjacent the opposite end of said pressure cylinder, a piston reciprocable in said pressure cylinder, an operating rod connected with said piston and extending through said closure means, said piston having passage means extending therethrough controlling the interflow of liquid between portions of the cylinder on opposite sides of said piston, said valve body having an opening extending therethrough for the passage of liquid from said pressure cylinder to said liquid reservoir upon movement of said piston toward said valve body, and pressure responsive valve means normally closing said opening against the flow of fluid from said pressure cylinder to said reservoir, said valve means being automatically actuatable to open position in response to a predetermined pressure of liquid in said pressure cylinder, the area of said opening being substantially 1.2% of the area of said operating rod.

BROUWER D. McINTYRE.
CHARLES J. SMITH.
JOHN DUTTON.

REFERENCES CITED

The following references are of record in the file of this patent:

UNITED STATES PATENTS

| Number | Name | Date |
| --- | --- | --- |
| 2,107,974 | Bechereau et al. | Feb. 8, 1938 |
| 2,335,907 | Boor et al. | Dec. 7, 1943 |
| 2,351,662 | Christofel | June 20, 1944 |